US012625584B2

(12) United States Patent
Zhao et al.

(10) Patent No.: US 12,625,584 B2
(45) Date of Patent: May 12, 2026

(54) MULTIMODAL TRAJECTORY INFORMATION PROCESSING AND ANALYSIS SYSTEM BASED ON MAN-MACHINE INTERACTION TERMINAL

(71) Applicant: Kingfar International Inc., Beijing (CN)

(72) Inventors: Qichao Zhao, Beijing (CN); Ran Yang, Beijing (CN)

(73) Assignee: Kingfar International Inc., Beijing (CN)

( * ) Notice: Subject to any disclaimer, the term of this patent is extended or adjusted under 35 U.S.C. 154(b) by 0 days.

(21) Appl. No.: 18/976,287

(22) Filed: Dec. 10, 2024

(65) Prior Publication Data

US 2025/0216989 A1 Jul. 3, 2025

(30) Foreign Application Priority Data

Dec. 29, 2023 (CN) .......................... 202311865497.9
Dec. 29, 2023 (CN) .......................... 202311865562.8

(51) Int. Cl.
*G06F 3/042* (2006.01)

(52) U.S. Cl.
CPC .......... *G06F 3/0421* (2013.01); *G06F 3/0428* (2013.01)

(58) Field of Classification Search
CPC ............................ G06F 3/0421; G06F 3/0428
See application file for complete search history.

(56) References Cited

U.S. PATENT DOCUMENTS

| | | | | |
|---|---|---|---|---|
| 5,205,132 A | * | 4/1993 | Fu ...................... | G01R 31/2891 |
| | | | | 236/78 B |
| 10,656,206 B1 | * | 5/2020 | Patil ................. | G01R 31/31905 |
| 2008/0278453 A1 | | 11/2008 | Reynolds et al. | |
| 2010/0031174 A1 | * | 2/2010 | Kim ................... | G06F 3/04886 |
| | | | | 715/764 |

(Continued)

FOREIGN PATENT DOCUMENTS

| | | |
|---|---|---|
| RU | 2636695 C2 | 11/2017 |
| RU | 2719474 C1 | 4/2020 |

OTHER PUBLICATIONS

Russian Grant of Patent for Application No. 2024138209/28(084649), mailed Oct. 16, 2025 (22 pages).

*Primary Examiner* — Afroza Chowdhury
(74) *Attorney, Agent, or Firm* — Wiersch Law Group

(57) ABSTRACT

Provided is a multimodal trajectory information processing and analysis system based on a man-machine interaction terminal. The system includes a collection device and an information processing device. The collection device is configured to collect, analyze and process finger operation trajectory information and send it to the information processing device, and the information processing device is configured to receive a display interface of a device under test in real time, and is configured to fuse and display the collected finger operation trajectory information corresponding to the display interface of the device under test, and obtain an evaluation system of man-machine interaction experience by analyzing a finger operation trajectory. The system achieves the simultaneous collection of the movement trajectory data and interaction data of the target object, which is convenient for accurately analyzing the rules and habits of the interactions between the users and the information systems.

11 Claims, 6 Drawing Sheets

(56)          References Cited

U.S. PATENT DOCUMENTS

| | | | | |
|---|---|---|---|---|
| 2012/0146954 A1* | 6/2012 | Park | ..................... | G06F 3/0421 |
| | | | | 345/175 |
| 2012/0218215 A1* | 8/2012 | Kleinert | ............... | G06F 3/0418 |
| | | | | 345/173 |
| 2015/0100254 A1 | 4/2015 | Chen et al. | | |
| 2015/0103051 A1* | 4/2015 | Wyrwas | ............... | G06F 3/0423 |
| | | | | 345/175 |
| 2015/0131010 A1* | 5/2015 | Sugiyama | ............. | G06F 3/0428 |
| | | | | 349/12 |
| 2015/0138162 A1 | 5/2015 | Leigh et al. | | |
| 2018/0089522 A1 | 3/2018 | Sami et al. | | |
| 2021/0405863 A1* | 12/2021 | Chen | .................. | G06F 3/04883 |

* cited by examiner

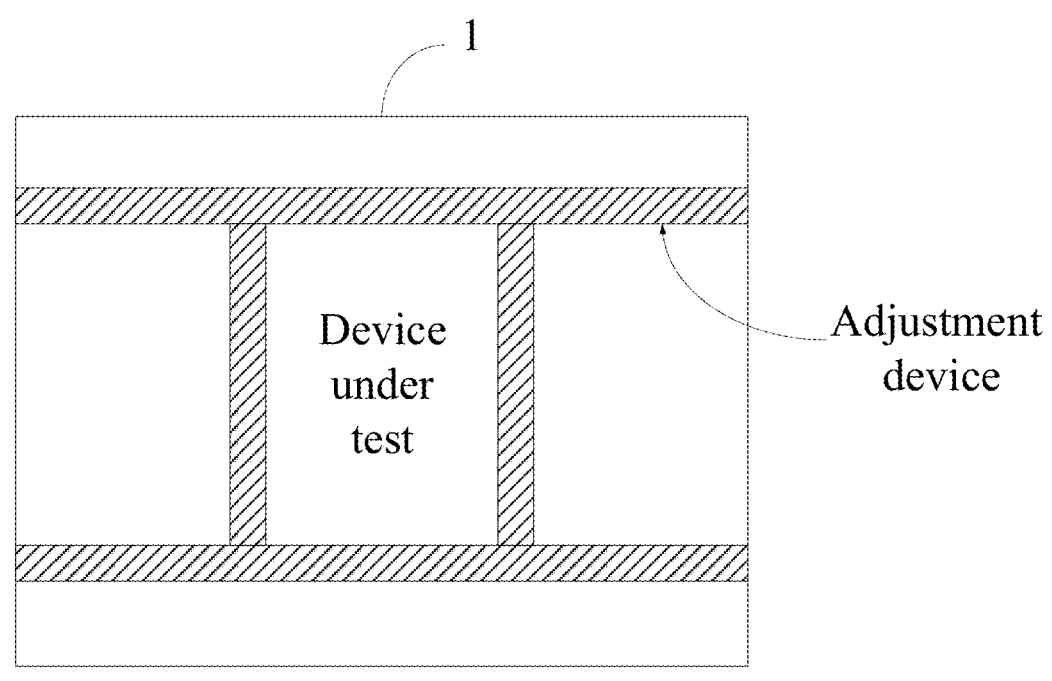

FIG. 4

| | |
|---|---|
| Obtaining interaction coordinate information and display content information of a device under test, and the interaction coordinate information being a location of at least one finger interacting on a collection device | S100 |
| Matching the obtained interaction coordinate information and display content information at the same time to obtain finger operation state information corresponding to display content of the device under test | S200 |
| Analyzing the finger operation state information to obtain operation interaction data of a finger on the device under test, and the finger operation interaction data at least includes a finger interaction trajectory, staying time and the number of interactions | S300 |

FIG. 5

MULTIMODAL TRAJECTORY INFORMATION PROCESSING AND ANALYSIS SYSTEM BASED ON MAN-MACHINE INTERACTION TERMINAL

CROSS-REFERENCE TO RELATED APPLICATIONS

The present application claims priority to Chinese Patent Application No. 202311865562.8, filed on Dec. 29, 2023, and to Chinese Patent Application No. 202311865497.9, filed on Dec. 29, 2023, the entire contents of which are incorporated herein by reference.

TECHNICAL FIELD

The present disclosure relates to the field of man-machine interaction technologies, and in particular to a multimodal trajectory information processing and analysis system based on man-machine interaction terminal.

BACKGROUND

With the continuous technological development, the interaction methods between users and information systems have expanded from traditional means such as buttons, handles, mice, and keyboards to multi-channel man-machine interaction methods such as touch screens, voice, and gestures. In order to understand the rules and habits of the interactions between users and information systems, it is necessary to collect and analyze the finger interaction trajectories of users during the touch screen interaction process.

In the related technologies, for the finger trajectory analysis method, the movement trajectory data of fingers is collected and analyzed, rather than directly collecting the data of the interaction between fingers and information. For the interaction analysis method, the data of the interaction between fingers and information products is first collected, and then the finger interaction trajectory is analyzed, but the trajectory data of fingers is not collected. Therefore, the collected data is not comprehensive enough, which is not conducive to accurately analyzing the rules and habits of the interactions between users and information systems.

SUMMARY

In order to simultaneously collect the movement trajectory data and interaction data of the target object, the present disclosure provides a multimodal trajectory information processing and analysis system based on man-machine interaction terminal.

According to a first aspect, the present disclosure provides a multimodal trajectory information processing and analysis system based on a man-machine interaction terminal, including a bracket, a lifting device, a collection device and an information processing device. The collection device is configured for collecting, and analyzing and processing finger operation trajectory information including real-time operation interaction information, and sending the collected finger operation trajectory information to the information processing device. The information processing device is configured for receiving a display interface of a device under test in real time, and is configured for fusing and displaying the collected finger operation trajectory information corresponding to the display interface of the device under test, and obtaining an evaluation system of man-machine interaction experience by analyzing finger operation trajectories.

By adopting the above technical solutions, the collection device can collect and analyze the finger operation trajectory information and transmit it to the information processing device, and the information processing device can receive the display interface of the device under test in real time, thereby achieving the simultaneous collection of the movement trajectory data and interaction data of the target object, which is convenient for accurately analyzing the rules and habits of the interactions between the users and the information systems.

Optionally, the multimodal trajectory information processing and analysis system based on a man-machine interaction terminal further includes a bracket and a lifting device. The bracket is configured for placing the device under test and for supporting an upper limb of a tester. The lifting device is connected to the bracket and is configured for adjusting a location of the bracket. The collection device is fixedly arranged on the lifting device at an end away from the bracket.

Optionally, the collection device is configured for collecting and outputting the real-time operation interaction information, and the operation interaction information at least includes interaction locations, a duration of the interaction locations and the number of the interaction locations. The information processing device is connected to the collection device and is configured for receiving the operation interaction information in real time, and generating finger operation trajectory information based on the received operation interaction information.

Optionally, the collection device includes a touch sensor unit, and the touch sensor unit is located above the display interface of the device under test.

Optionally, the touch sensor unit is made of transparent plate material, and the touch sensor unit covers the display interface of the device under test.

Optionally, the touch sensor unit is a transparent film, and is closely attached to the display interface of the device under test.

Optionally, the collection device includes an optical sensor unit, and transmitting ends of the optical sensor unit are vertically arranged along two adjacent sides of the device under test, and receiving ends of the optical sensor are arranged along another two adjacent sides of the device under test.

Optionally, the transmitting ends of the optical sensor unit are configured for transmitting optical signals, and the receiving ends of the optical sensor unit are configured for receiving the optical signals transmitted by the transmitting ends.

The optical sensor unit is configured for determining coordinates of blocked locations as coordinate points of the finger operation interactions when the receiving ends are unable to receive the optical signals, and is further configured for monitoring the staying time of a finger at the coordinate points and the number of finger operation interactions to obtain operation interaction information.

Optionally, an optical signal arrangement of the optical sensor unit is arranged based on an M*N matrix, matrix arrangements of the transmitting ends and the receiving ends the oppositely arranged of the optical sensor unit are the same, and optical signal arrangements of the optical sensor unit are arranged in one-to-one correspondence on opposite sides of the device under test.

Optionally, the multimodal trajectory information processing and analysis system based on a man-machine interaction terminal further includes a distance measuring device and a controller. The distance measuring device is configured for detecting a distance between the collection device and the device under test, and outputting a distance detection signal. The lifting device is connected to the controller and is configured for adjusting the distance between the collection device and the device under test in response to receiving a control signal.

Optionally, the collection device further includes a positioning unit, and the positioning unit is configured for calibrating locations to be tested on the display interface of the device under test, and for matching with locations of the finger operation interaction of the collection unit in the collection device.

Optionally, the collection device further includes an adjustment device, and the adjustment device is configured for adjusting the collection unit in the collection device to adapt to display interface sizes of devices under test of different sizes.

Optionally, the optical sensor unit includes an infrared transceiver sensor.

Optionally, in order to realize the collection of the interaction locations by the collection device, the collection device is specifically configured for: obtaining a plurality of light intensity signals, the light intensity signals being configured to reflect light intensity of infrared light received by any infrared receiver in a group of first receivers or any infrared receiver in a group of second receivers, and the first receivers and the second receivers being infrared receivers arranged along two adjacent sides of the device under test; determining a finger area based on a location of an infrared receiver with a weaker output light intensity signal and a location of an infrared transmitter that emits infrared light; and determining an effective finger area of the finger area to obtain interaction coordinate information.

Optionally, in order to realize the determination of the finger area based on the location of the infrared receiver with the weaker output light intensity signal and the location of the infrared transmitter that emits the infrared light, the collection device is specifically configured for: determining a plurality of blocking paths based on the location of the infrared transmitter that emits the infrared light at each moment and the location of the infrared receiver with the weaker output light intensity signal; and determining an overlapping area of the plurality of blocking paths and recording the overlapping area as the finger area.

Optionally, in order to realize the determination of the effective finger area in the finger area, the collection device is specifically configured for: determining whether an area of each finger area does not exceed 0.5 cm² and is not less than 0.01 cm²; and determining whether each finger area is quasi-circular. In response to the finger area simultaneously satisfying the above two conditions, the finger area is interaction coordinate information.

Optionally, in order to realize the determination of whether each finger area is quasi-circular, the collection device is specifically configured for: obtaining coordinate information of each point in the finger area; determining a centroid coordinate of the finger area based on the coordinate information; determining distances from the centroid coordinate to edges of the finger area based on the centroid coordinate and the coordinate information of each point in the finger area; and calculating a variance value based on the distances from the centroid coordinate to the edges of the finger area. In response to the variance value being less than or equal to a preset threshold, the finger area is quasi-circular. In response to the variance value being greater than the preset threshold, the finger area is non-quasi-circular.

Optionally, the collection device is further configured for calculating the area of the finger area, and the calculation method includes: counting the number of intersections in the finger area; and determining the area of the finger area based on a product of the number of intersections and a unit area.

Optionally, the collection device is further configured for: prior to obtaining a plurality of light intensity signals, obtaining a set of ambient light information; determining stability degree of ambient light based on the ambient light information; and determining whether to turn on an anti-interference mode based on the stability degree.

Optionally, the collection device is further configured for: in response to the anti-interference mode being turned on, and subsequent to obtaining a plurality of light intensity signals in real time, processing the light intensity signals based on the ambient light information.

In view of the above, the present disclosure includes at least one of the following beneficial technical effects: the collection device can collect and analyze the finger operation trajectory information and transmit it to the information processing device, and the information processing device can receive the display interface of the device under test in real time, thereby achieving the simultaneous collection of the movement trajectory data and interaction data of the target object, which is convenient for accurately analyzing the rules and habits of the interactions between the users and the information systems.

In order to be able to accurately analyze the rules and habits of the interactions between the users and the information systems, the present disclosure provides a multimodal finger trajectory collection method, related device and storage medium.

According to a second aspect, the present disclosure provides a multimodal finger trajectory collection method, including: obtaining interaction coordinate information and display content information of a device under test, and the interaction coordinate information being a location of at least one finger interacting on a collection device; matching the obtained interaction coordinate information and display content information at the same time to obtain finger operation state information corresponding to display content of the device under test; and analyzing the finger operation state information to obtain operation interaction data of a finger corresponding to the device under test, and the finger operation interaction data at least includes a finger interaction trajectory, staying time and the number of interactions.

By adopting the above technical solutions, the interaction coordinate information and the interface information of the device under test can be collected simultaneously, and the interaction coordinate information and the interface information of the device under test can be matched to obtain the finger operation state information. The finger operation interaction data can be obtained by analyzing the finger operation state information, so as to accurately analyze the rules and habits of the interactions between the users and the information systems.

In a possible implementation, the interaction coordinate information is converted from one of a touch signal, optical signal, and electrical signal output by the collection device.

In a possible implementation, the optical signal is a light intensity signal output by an infrared transmitter. In a possible implementation, the obtaining the interaction coordinate information includes: obtaining a plurality of light intensity signals, the light intensity signals being configured to reflect light intensity of infrared light received by any infrared receiver in a group of first receivers or any infrared receiver in a group of second receivers, and the first receivers and the second receivers being infrared receivers arranged along two adjacent sides of the device under test; determining a finger area based on a location of an infrared receiver with a weaker output light intensity signal and a location of an infrared transmitter that emits infrared light; and determining an effective finger area in the finger area to obtain the interaction coordinate information.

By adopting the above technical solutions, when the tester operates the device under test, the infrared receiver can receive the infrared light, the infrared light intensity is analyzed, and the light intensity signal is output. When the infrared light is blocked by the finger, the light intensity of the infrared light received by the infrared receiver may be significantly weakened. Based on this, the interaction coordinate information may be determined based on the location of the infrared receiver with the weaker output light intensity signal and the location of the infrared transmitter that emits infrared light. Since there are a plurality of infrared transmitters and they are arranged in different directions, the finger trajectories of a plurality of fingers may be obtained.

In a possible implementation, the determining the finger area based on the location of the infrared receiver with the weaker output light intensity signal and the location of the infrared transmitter that emits infrared light includes: determining a plurality of blocking paths based on the location of the infrared transmitter that emits infrared light at each moment and the location of the infrared receiver with the weaker output light intensity signal; and determining an overlapping area of the plurality of blocking paths and recording the overlapping are as the finger area.

In a possible implementation, the determining the effective finger area in the finger area includes: determining whether an area of each finger area does not exceed 0.5 cm$^2$ and is not less than 0.01 cm$^2$; and determining whether each finger area is quasi-circular. In response to the finger area simultaneously satisfying the above two conditions, the finger area is the interaction coordinate information.

By adopting the above technical solutions, some trajectories caused by accidental touches can be excluded.

In a possible implementation, the determining whether each finger area is quasi-circular includes: obtaining coordinate information of each point in the finger area; determining a centroid coordinate of the finger area based on the coordinate information; determining distances from the centroid coordinate to edges of the finger area based on the centroid coordinate and the coordinate information of each point in the finger area; and calculating a variance value based on the distances from the centroid coordinate to the edges of the finger area. In response to the variance value being less than or equal to a preset threshold, the finger area is quasi-circular. In response to the variance value being greater than the preset threshold, the finger area is non-quasi-circular.

In a possible implementation, the area calculation method of the finger area further includes: counting the number of intersections in the finger area; and determining the area of the finger area based on a product of the number of intersections and a unit area.

In a possible implementation, prior to obtaining the plurality of light intensity signals in real time, the multimodal finger trajectory collection method further includes: obtaining a set of ambient light information; determining stability degree of ambient light based on the ambient light information; and determining whether to turn on an anti-interference mode based on the stability degree.

By adopting the above technical solutions, the stability degree of the ambient light can be analyzed. When the ambient light is unstable, the anti-interference mode is turned on to reduce the influence of the ambient light on the process of analyzing the finger trajectory.

In a possible implementation, the multimodal finger trajectory collection method further includes: in response to the anti-interference mode being turned on, subsequent to obtaining the plurality of light intensity signals in real time, processing the light intensity signals based on the ambient light information.

According to a third aspect, the present disclosure provides a multimodal finger trajectory collection device, including: a collection module configured for obtaining interaction coordinate information and display content information of a device under test, and the interaction coordinate information being a location of at least one finger interacting on the collection device; a fusion module configured for matching the obtained interaction coordinate information and display content information at the same time to obtain finger operation state information corresponding to display content of the device under test; and an analysis and processing module configured for obtaining operation interaction data of a finger corresponding to the device under test by analyzing the finger operation state information, and the finger operation interaction data at least includes a finger interaction trajectory, staying time and the number of interactions.

According to a fourth aspect, the present disclosure provides an electronic device. The electronic device includes a memory and a processor. The memory stores a computer program that can be loaded by the processor to execute the above-mentioned multimodal finger trajectory collection method.

According to a fifth aspect, the present disclosure provides a multimodal finger trajectory collection system, including the electronic device described in the fourth aspect.

According to a sixth aspect, the present disclosure provides a computer-readable storage medium, storing a computer program that can be loaded by the processor to execute any of the above-mentioned multimodal finger trajectory collection methods.

In view of the above, the present disclosure includes at least one of the following beneficial technical effects: the interaction coordinate information and the interface information of the device under test can be collected simultaneously, and the interaction coordinate information and the interface information of the device under test can be matched to obtain the finger operation state information. The finger operation interaction data can be obtained by analyzing the finger operation state information, so as to accurately analyze the rules and habits of the interactions between the users and the information systems.

BRIEF DESCRIPTION OF DRAWINGS

In order to explain the technical solutions of embodiments of the present disclosure more clearly, the following will briefly introduce the drawings required in the embodiments. It is appreciated that, the drawings described below are only some embodiments of the present disclosure. For those of ordinary skill in the art, other drawings can also be obtained based on these drawings without creative efforts.

FIG. 4 is a schematic diagram of an adjustment device according to an embodiment of the present disclosure.

FIG. 5 is a flow chart of a multimodal finger trajectory collection method according to an embodiment of the present disclosure.

Reference signs: 1—Bracket, 2—Lifting device, 3—Collection device, 4—Controller, 5—Information processing device, 6—Distance measuring device, 21—Collection module, 22—Fusion module, 23—Analysis and processing module, 301—CPU, 302—ROM, 303—RAM, 304—Bus, 305—I/O interface, 306—Input part, 307—Output part, 308—Storage part, 309—Communication part, 310—Actuator, and 311—Removable medium.

DESCRIPTION OF EMBODIMENTS

To make the purpose, technical solutions and advantages of the present disclosure clearer, a further detailed description of the present disclosure is provided with reference to the following embodiments and figures. It should be understood that specific embodiments described here are only configured to explain the present disclosure and are not configured to limit the present disclosure.

Embodiments of the present disclosure discloses a multimodal trajectory information processing and analysis system based on man-machine interaction terminal, which can simultaneously collect movement trajectory data and interaction data of a target object, so as to accurately analyze rules and habits of the interactions between the user and the information system.

Figure 1:
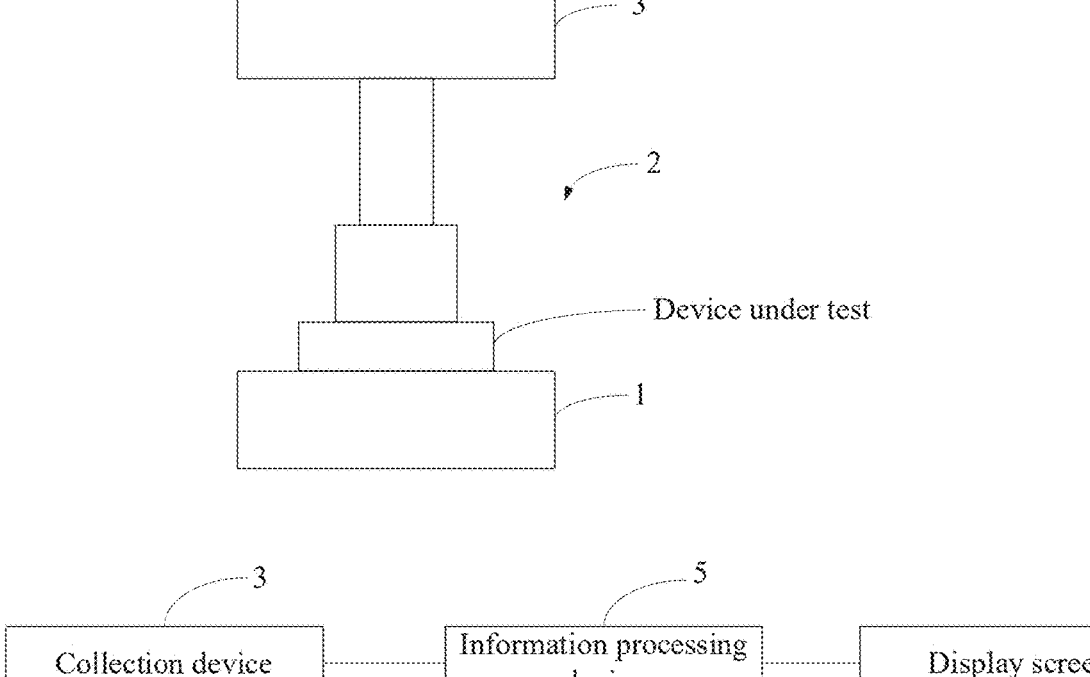
FIG. 1 is a structural schematic diagram of a multimodal trajectory information processing and analysis system based on man-machine interaction terminal according to an embodiment of the present disclosure.
Figure 2:
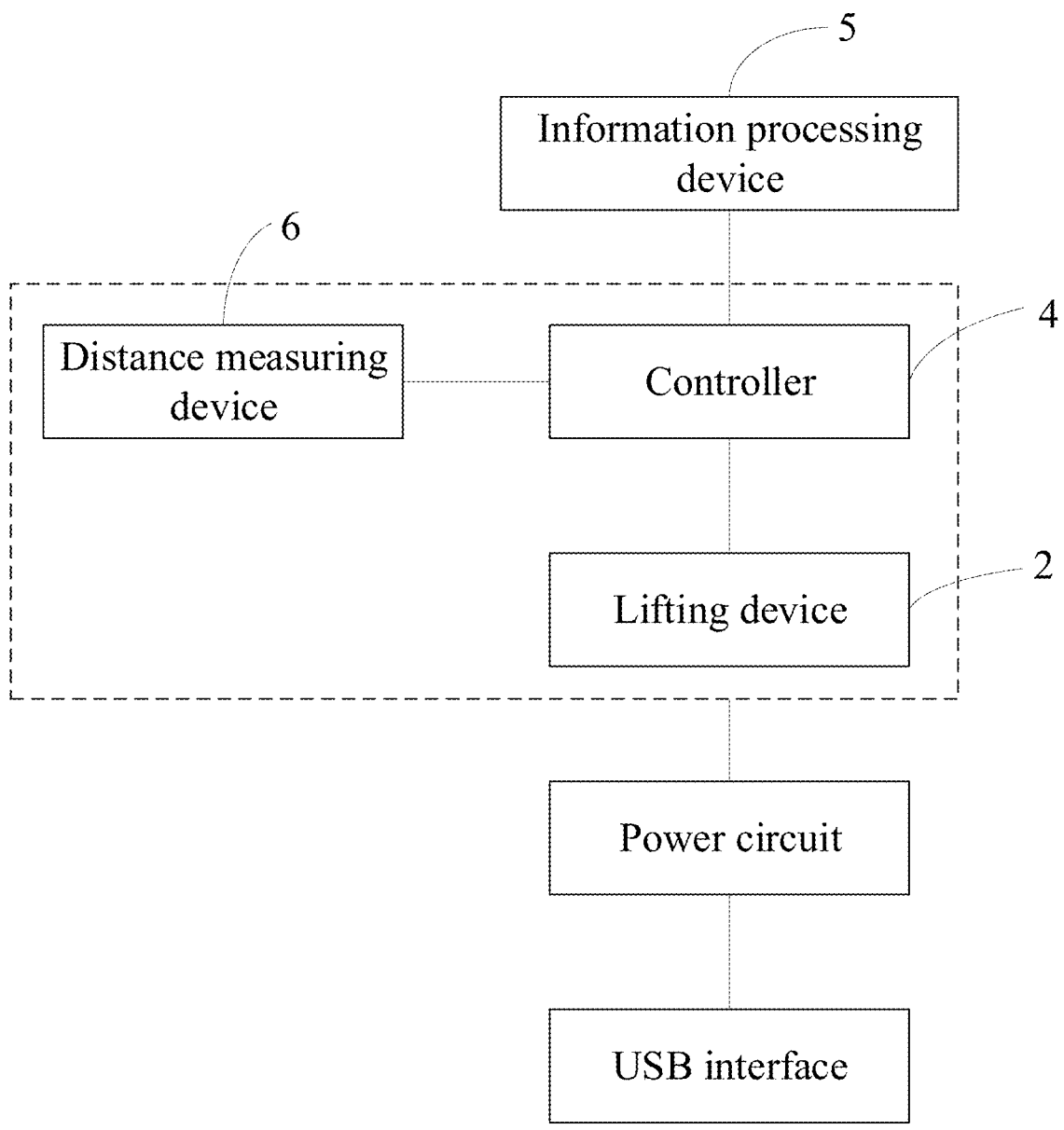
FIG. 2 is a systematic diagram of a multimodal trajectory information processing and analysis system based on man-machine interaction terminal according to an embodiment of the present disclosure.

Referring to FIG. 1 and FIG. 2, a multimodal trajectory information processing and analysis system based on the man-machine interaction terminal includes a bracket 1, a lifting device 2, a collection device 3, a controller 4 and an information processing device 5.

The bracket 1 is configured for placing a device under test and supporting an upper limb of a tester. The device under test may be a terminal or mobile terminal with an interactive interface such as a mobile phone, a tablet, a laptop, etc. In order to test the device under test and collect the movement trajectory data and interaction data of the finger, it is necessary to place the screen of the device under test horizontally, so that the bracket 1 includes two opposite horizontal planes to enable the bracket 1 to be placed stably. In some embodiments, the bracket 1 may be rectangular or cylindrical.

Further, the side of the bracket 1 configured to place the device under test is also provided with stoppers to ensure that when the device under test is placed on the bracket 1, the location of the device under test may be limited, avoiding the movement of the device under test during the test process.

At the same time, in order to facilitate the testing of testers of different heights, the height of the bracket 1 is adjustable.

The lifting device 2 is connected to the bracket 1 and is on the same side as the side for placing the device under test. The lifting device 2 may be adjusted in the vertical direction to adjust the location of the bracket 1. It can be understood that since during the test process, it is necessary that the distance between the collection device 3 and the device under test can support the movement trajectory data of the tester's finger on the collection device 3 to be transmitted to the device under test, so as to trigger the interaction behavior. As a result, the distance between the collection device 31 and the device under test needs to be adjusted through the lifting device 2.

In some embodiments, the lifting device 2 may be any device that can achieve the lifting function. For example, the lifting device 2 may be a device manually adjusted by the tester or a device that can be automatically adjusted.

The collection device 3 is fixedly arranged at an end of the lifting device 2 away from the bracket 1. The collection device 3 is configured for collecting and analyzing the finger operation trajectory information including real-time operation interaction information, and the finger operation trajectory information is transmitted to the information processing device 5 through the controller 4. The operation interaction information at least includes interaction locations, durations of the interaction locations and the number of the interaction locations.

It can be understood that in order to accurately analyze the rules and habits of the interactions between the users and the information systems, it is necessary to simultaneously collect the movement trajectory data and interaction data of the user's finger. However, generally, manufacturers of terminals or mobile terminals such as mobile phones and tablets cannot authorize the user's data to third parties, so as to protect the privacy of the user. Therefore, it is necessary to collect the movement trajectory data and interaction data of the user's finger through external devices. Since there are a plurality of principles for collecting the movement trajectory data of the user's finger, various devices can realize the collection of the movement trajectory data. In the present disclosure, the device that can realize the collection of the movement trajectory data in the collection device 3 is called a collection unit.

In some embodiments, the collection unit is a touch sensor unit. The touch sensor unit is located above the display interface of the device under test and is configured for collecting the real-time operation interaction information. The touch sensor unit may be made of a transparent plate. In this case, the touch sensor unit needs to cover the display interface of the device under test. The touch sensor unit may also be a transparent film. The touch sensor unit needs to be closely attached to the display interface of the device under test.

In some embodiments, the collection unit is an optical sensor unit. The optical sensor unit is divided into two parts, namely transmitting ends and the receiving ends. The transmitting ends of the optical sensor unit may emit light, and the receiving ends of the optical sensor unit may receive light. When the receiving ends of the optical sensor unit receive optical signals, the optical path is turned on. Otherwise, when the receiving ends of the optical sensor unit does not receive optical signals, the optical path is not turned on. Based on this, the transmitting ends of the optical sensor unit need to be vertically arranged along two adjacent sides of the device under test, and the receiving ends of the optical sensor unit are arranged along another two adjacent sides of the device under test. Thus, coordinates of currently blocked locations may be determined as coordinate points of finger operation interactions based on the situation of the optical signals received by the receiving ends of the optical sensor unit. When the interaction locations are determined, the optical sensor unit may also analyze staying time and the number of finger operation interactions, that is, the operation interaction information is obtained.

It is worth noting that in the above embodiments, the interaction locations that may be determined are two-dimensional coordinates. In order to make the detection of the interaction locations more accurate (three-dimensional), the optical sensor unit may also be improved to describe the interaction locations with three-dimensional coordinates.

Figure 3:
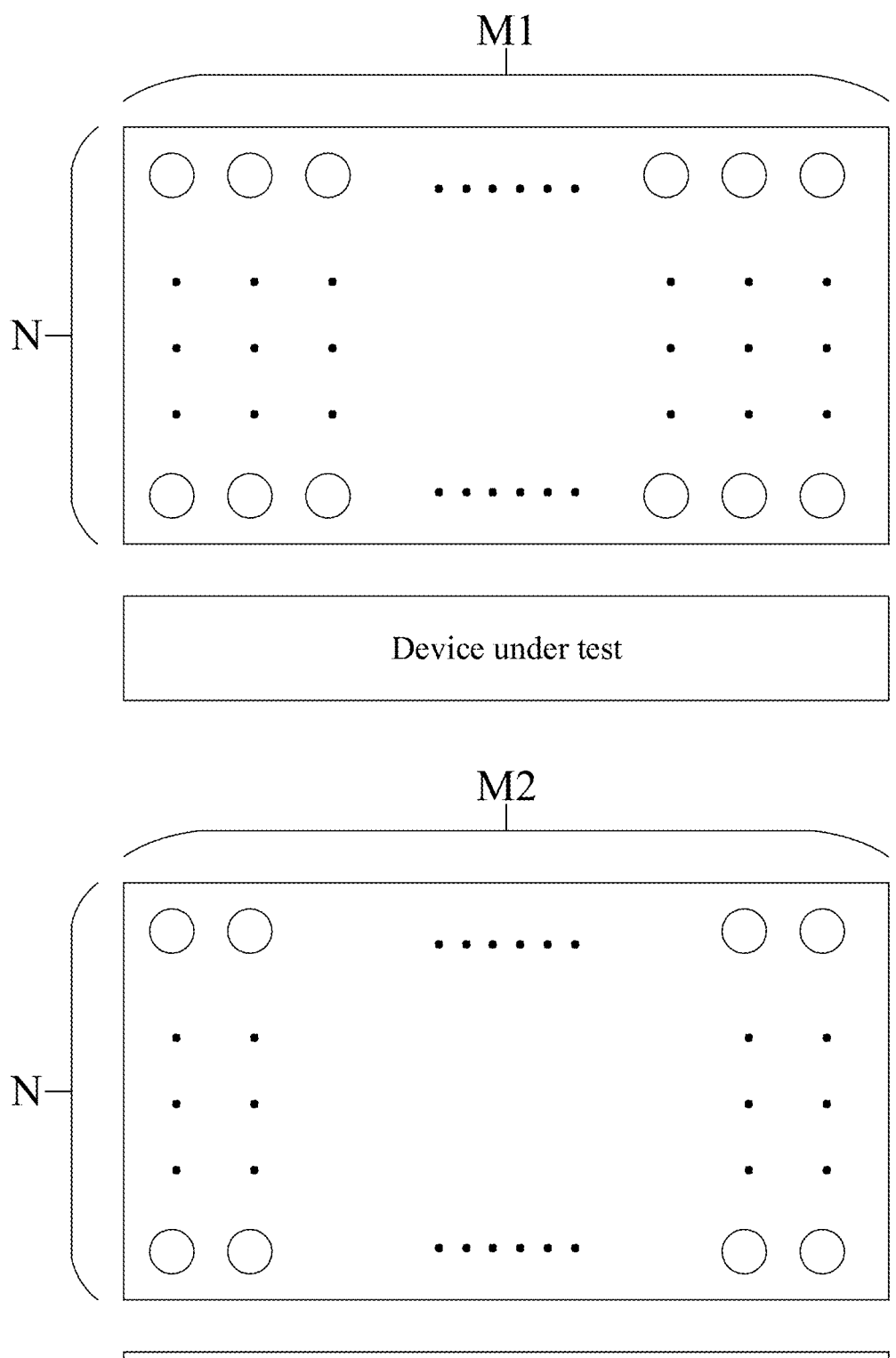
FIG. 3 is a schematic diagram of an arrangement of optical sensor units according to an embodiment of the present disclosure.

Referring to FIG. 3, specifically, the optical signals of the optical sensor unit may be arranged in a matrix of M*N and arranged along the opposite sides of the device under test. In other words, the optical signals of the optical sensor unit may not only be arranged along the opposite sides of the device under test, but also in a plurality of rows along the direction perpendicular to the device under test. In this way, when the tester conducts the test, the distance between the tester's finger and the screen of the device under test may also be determined based on the situation of the optical signals received by the receiving ends of the optical sensor unit, thereby determining the interaction locations according to three coordinate axes. In order to realize the above functions, M1 transmitting ends may be arranged along one side of the device under test, M2 transmitting ends may be arranged along the other side of the device under test, and N transmitting ends may be arranged along the direction perpendicular to the device under test. Correspondingly, M1 receiving ends may be arranged along one side of the device under test, M2 receiving ends may be arranged along the other side of the device under test, and N receiving ends may be arranged along the direction perpendicular to the device under test.

In some embodiments, the optical sensor unit may include an infrared transceiver sensor.

When the optical sensor units include infrared transceiver sensors, in order to realize the collection of the interaction locations by the collection device, the collection device is specifically configured for: obtaining a plurality of light intensity signals reflecting light intensity of infrared light received by any infrared receiver in a group of first receivers or any infrared receiver in a group of second receivers, the first receivers and the second receivers are infrared receivers arranged along two adjacent sides of the device under test; determining a finger area based on a location of an infrared receiver with a weaker output light intensity signal and a location of an infrared transmitter that emits infrared light; and determining an effective finger area in the finger area to obtain interaction coordinate information. The interaction coordinate information here may be used as the above-mentioned interaction locations.

The specific implementation of the collection device collecting the interaction coordinate information may refer to the corresponding description in the subsequent embodiments shown in FIG. 5, which will not be elaborated here.

Referring to FIG. 4, since the display interfaces of different devices under test have different sizes, the collection device 3 needs to be able to adapt to devices under test with different display interface sizes. In addition, because the collection device 3 is able to adapt to devices under test with different display interface sizes, when the operation of the tester exceeds the collection range during the test process, it is prone to causing misjudgment of the collection unit. For this reason, the collection device 3 also includes an adjustment device. The adjustment device is configured for adjusting the collection range of the collection unit of the collection device 3. For example, when the device under test is placed on the bracket 1, the tester may make adjustments through the adjustment device to define the collection range along the edges of the device under test, thereby facilitating the use of the collection unit for testing.

In some embodiments, the location of the adjustment device may be adaptively adjusted according to the collection unit. For example, when the collection unit is a touch sensor unit, the adjustment device may be arranged above the touch sensor unit. When the collection unit is an optical sensor unit, the adjustment device may be arranged below the optical sensor unit.

The adjustment device may be a mechanical structure manually adjustable by the tester or an electronically controlled structure automatically adjustable.

The collection device 3 also includes a positioning unit. The positioning unit is configured for calibrating the locations to be tested on the display interface of the device under test and matching with the finger operation interaction locations of the collection unit.

The information processing device 5 is connected to the collection device 3 and is configured to be connected to the device under test. The information processing device 5 is configured for receiving a display interface of a device under test in real time, and is configured for displaying the collected finger operation trajectory information corresponding to the display interface of the device under test, and obtaining an evaluation system of man-machine interaction experience by analyzing finger operation trajectories. In some embodiments, the information processing device 5 may be a computer.

In some embodiments, the lifting device 2 may achieve automatic lifting. The specific implementation method is as follows.

The multimodal trajectory information processing and analysis system based on the man-machine interaction terminal further includes a distance measuring device 6.

The distance measuring device 6 is configured for detecting a distance between the collection device 3 and the device under test and outputting a distance detection signal. The distance measuring device 6 may be an infrared distance meter or a laser distance meter or other devices.

The controller 4 is connected to the distance measuring device 6 and is configured for receiving the distance detection signal and outputting a control signal in response to the distance reflected by the received distance detection signal exceeding a preset distance. It should be noted that during the test process of the device under test, the distance between the collection device 3 and the device under test needs to be able to support the movement trajectory data of the tester's finger on the collection device 3 to be transmitted to the device under test, so the distance reflected by the distance detection signal needs to be less than the preset distance. It is appreciated that, for the case where the collection device 3 includes a touch sensor unit, the touch sensor unit needs to be completely attached to the device under test to ensure that the movement trajectory data is transmitted to the device under test. Otherwise, when the distance reflected by the received distance detection signal exceeds the preset distance, it means that the distance between the collection device 3 and the device under test does not satisfy the test requirements and needs to be adjusted twice. At this time, the controller 4 outputs a control signal to the lifting device 2 for adjustment.

In order to enable the distance measuring device 6, the controller 4 and the lifting device 2 to work normally, power may be supplied with the USB interface.

Next, in combination with the testing process, a further introduction to the multi-modal trajectory information processing and analysis system based on the man-machine interaction terminal will be provided.

First, the device under test needs to be placed on the bracket 1, that is, the device under test is fixed by the stoppers.

Then, the distance between the collection device 3 and the device under test is adjusted by adjusting the lifting device 2 to make the distance between the collection device 3 and the device under test less than the preset distance. Since various devices under test have different thicknesses, the states of the lifting device 2 are also different each time the test is performed. The process of adjusting the lifting device 2 may be manually adjusted by the tester or automatically adjusted by the lifting device 2.

The adjustment process is as follows: when the multi-modal trajectory information processing and analysis system based on the man-machine interaction terminal is powered on, the distance measuring device 6 starts to measure the distance between the collection device 3 and the device under test and outputs a distance detection signal. The controller 4 determines whether the collection device 3 is attached to the device under test based on the distance reflected by the distance detection signal. When the collection device 3 is attached to the device under test, the next step is performed, namely calibration. Otherwise, when the collection device 3 is not attached to the device under test, the height of the collection device 3 needs to be adjusted, the lifting device 2 is controlled to adjust the height of the collection device 3 based on the distance reflected by the distance detection signal. Subsequently, the distance between the collection device 3 and the device under test is measured again, and the controller 4 determines whether the collection device 3 is attached to the device under test. When the collection device 3 is not attached to the device under test, the above steps are repeated until the collection device 3 is attached to the device under test. Then, calibration is performed.

It is worth noting that since the sizes of various devices under test are different, the size of the collection device 3 is designed to be much larger than the size of the device under test. In the actual testing, the tester's finger moves on the collection device 3, and the moving range is larger than the size of the device under test, which is prone to invalid operations. Therefore, calibration is required to determine the size of the device under test in the collection device 3.

The calibration process is as follows: the four corners of the device under test on the collection device 3 are selected to define the range of the device under test. The location information of the four corners is identified by the collection unit and converted into coordinate information, and the coordinate information is transmitted to the information processing device 5.

After the calibration is completed, the collection may be started. The tester's finger slides on the collection device 3, and the collection unit collects the operation interaction information of the finger and transmits the same to the information processing device 5. The real-time display interface of the device under test is further transmitted to the information processing device 5 to complete the collection of the finger operation trajectory information and interaction information.

The method for analyzing movement trajectories may adopt video image recognition technologies, that is, the object to be captured is marked with a specific color, and then the system tracks and records the movement trajectories of the object to be captured with the color.

It should be noted that during the analysis process, the effective operation should be determined first based on the calibrated range of the device under test.

In some embodiments, the multimodal trajectory information processing and analysis system based on the man-machine interaction terminal may also integrate an electro-encephalogram (EEG) signal collection device 3 and/or an eye movement information collection device 3. With the eye movement device worn by the tester or the input device operated by the tester during the browsing of the interactive interface, the eye movement data or the input data is collected, and the behavior data of the tester in the interest area of the drawn interactive interface is obtained based on the collected eye movement data or input data. When the tester browses the interactive interface, the eye movement device is worn or the input device is operated to collect data, and the behavior data of the tester in the interest area of the interactive interface is obtained based on the collected data. Meanwhile, the EEG information is collected to obtain EEG signals of positive feedback, so as to assist in confirming the interest point of the corresponding content.

The eye movement data of the tester when browsing the interactive interface is collected by wearing the eye movement device. The eye movement data includes but is not limited to: fixation time, fixation count, saccade time and eye movement trajectory. The behavior data of the tester when browsing the interactive interface may be obtained based on the collected eye movement data. The eye movement device includes but is not limited to: an eye tracker. The input data of the tester when browsing the interactive interface may also be collected by manipulating the input device. The input data includes but is not limited to: the click count and movement trajectory of the input device. The behavior data and EEG signals of the user when browsing the interactive interface may be obtained based on the collected input data.

In some embodiments, the controller 4 is a single-chip microcomputer.

Embodiments of the present disclosure also provide a multimodal finger trajectory collection method, which is applied in a device capable of collecting finger trajectories. It can be understood that generally, manufacturers of terminals or mobile terminals such as mobile phones and tablets cannot authorize the user' data to third parties, so as to protect the privacy of the user. Therefore, when it is necessary to analyze the rules and habits of the interactions between the users and the information systems by collecting the movement trajectory data of the user' finger, only the movement trajectory data of the user' finger can be collected with external devices.

The main process description of the multimodal finger trajectory collection method according to the embodiments of the present disclosure is as follows.

As shown in FIG. 5:

Step S100: obtaining interaction coordinate information and display content information of a device under test.

The interaction coordinate information includes the locations of at least one finger of the tester on the display screen of the device under test. It can be understood that the interaction coordinate information is coordinate data, which needs to be obtained by converting the electrical signals related to the interaction locations collected by the collection device. For example, the collection device may be a sensing device capable of outputting touch signals, such as a touch screen, or the collection device may be a sensing device capable of outputting optical signals, such as an infrared transceiver sensor or a laser transceiver sensor. When collecting with an infrared transceiver sensor, the light intensity signals output by the infrared transceiver sensor may be converted into interaction coordinate information. It is understandable that, other devices may also be selected.

In some embodiments, the collection device may, for example, include the collection device 3 in the foregoing embodiments. In some other embodiments, the collection device may further include the information processing device 5 in the foregoing embodiments.

It is worth noting that when selecting collection devices, attention should be paid that since most of the terminal devices with display screens that we use, such as mobile phones and tablets, are capacitive screens which can support multi-touch operations, if the method of superimposing a resistive screen is adopted to collect the touch behavior of the tester, the resistive screen, which is unable to support multi-touch operations, will not be able to collect the finger trajectories a plurality of fingers of the tester. In other words, it cannot meet the collection requirements. If the method of superimposing a capacitive screen is adopted to collect the touch behavior of the tester, touch behavior of the tester will be unable to be transmitted to the device under test due to the superimposed capacitive screen, and thus the test process cannot be implemented on the device under test.

In some embodiments, an infrared transceiver sensor is taken as an example of the collection device for introduction.

First, the collection device is configured as follows. A group of first transmitters and a group of second transmitters are fixedly arranged on the same horizontal plane. Both the first transmitters and the second transmitters include a plurality of infrared transmitters. Similarly, in order to receive the infrared light emitted by the infrared transmitters of the first transmitters and the second transmitters, a group of first receivers and a group of second receivers are also fixedly arranged on the above same horizontal plane. The first receivers and the second receivers also include a plurality of infrared receivers. A group of first transmitters, a group of second transmitters, a group of first receivers and a group of second receivers form a rectangular collection area to collect the finger trajectories of the tester when operating on the device under test. Considering that the sizes of terminal devices with display screens such as the mobile phones or tablets under test are different, the first transmitters and the second transmitters need to include a sufficient number of infrared transmitters. The number of infrared receivers in the first receivers needs to be consistent with the number of infrared transmitters in the first transmitters, and the number of infrared receivers in the second receivers needs to be consistent with the number of infrared transmitters in the second transmitters. During the test, the tester only needs to place the device under test under the collection area so that the display screen of the device under test is parallel to the collection area.

In some embodiments, there are 16 infrared transmitters in the first transmitters and 25 infrared transmitters in the second transmitters. In some other embodiments, the number of infrared transmitters in the first transmitters and the number of infrared transmitters in the second transmitters may be adaptively adjusted according to actual needs.

Optionally, the step S100 includes the following steps (Step S110-Step 130):

Step S110: obtaining the interaction coordinate information and the display content information of the device under test. The interaction coordinate information is the locations of at least one finger interacting on the collection device.

The interaction coordinate information is converted from one of the touch signals, optical signals, and electrical signals output by the collection device.

In embodiments of the present disclosure, an illustration is provided by taking the optical signals as a specific example for obtaining the interactive coordinate information. In some embodiments, the optical signals may be the light intensity signals output by the infrared transmitters.

The interaction coordinate information may be obtained by obtaining a plurality of light intensity signals in real time. The light intensity signals are configured to reflect the light intensity of the infrared light received by any infrared receiver in a group of first receivers or any infrared receiver in a group of second receivers.

It can be understood that since the finger trajectories are collected based on the optical path connection state in the present disclosure, the light intensity signals received by the infrared receivers during the test process will be affected by ambient light, specifically the light intensity of the ambient light and the change frequency of the ambient light. Therefore, before the test starts, a group of ambient light needs to be collected for analysis.

First, a set of ambient light information is obtained.

It can be understood that the ambient light information is configured to reflect the light intensity of the ambient light and may be collected by the infrared receivers. The infrared receiver is internally provided with an analog-to-digital converter, which can quantify the collected optical signals to determine the light intensity. Moreover, the collection frequency of the infrared receiver may also be set to adapt to the ambient light of different frequencies, so as to analyze the change frequency of the light intensity by adjusting the collection frequency.

The obtained set of ambient light information may be the ambient light within a period of time.

Subsequently, the stability degree of ambient light is determined based on the ambient light information.

Finally, it is determined whether to turn on the anti-interference mode based on the stability degree.

It can be understood that the excessive light intensity of the ambient light may affect the infrared light intensity received by the infrared receiver. Correspondingly, the fast change frequency of the ambient light may also affect the infrared light intensity received by the infrared receiver, resulting in recognition errors. For this reason, an anti-interference mode is also provided. When the anti-interference mode is turned on, the influence of the ambient light on the identification of the infrared light by the infrared receiver may be reduced.

A change frequency threshold and an intensity threshold are preset. When the light intensity of the ambient light reaches the intensity threshold or the change frequency of the ambient light reaches the change frequency threshold, it indicates that the ambient light may have a greater impact on the identification of the infrared light by the infrared receiver. At this time, the anti-interference mode needs to be turned on to process the light intensity signals during the collection of the finger trajectories, thereby reducing the influence of the ambient light on the identification accuracy of the infrared receiver. Alternatively, when the light intensity of the ambient light is lower than the light intensity threshold and the change frequency of the ambient light is lower than the change frequency threshold, it indicates that the influence of the ambient light on the identification of the infrared light by the infrared receiver may be ignored. At this time, there is no need to turn on the anti-interference mode. In different embodiments, the intensity threshold and the change frequency threshold may be adaptively adjusted according to the actual situations.

Figure 6:
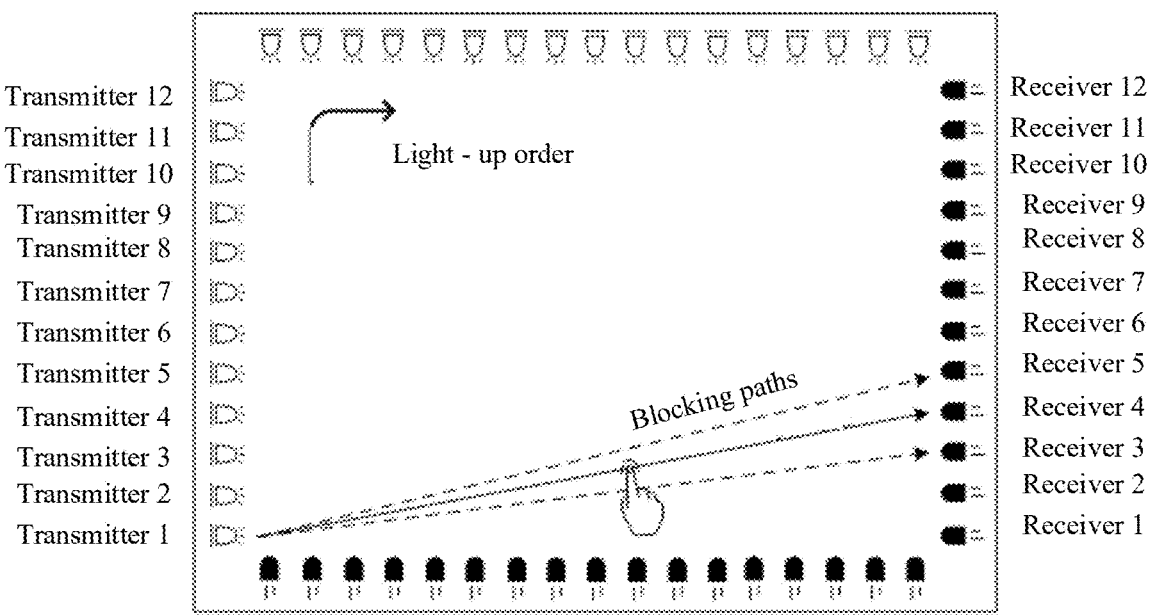
FIG. 6 is a schematic diagram of an order of infrared transmitters emitting infrared light according to an embodiment of the present disclosure.

Furthermore, considering that during the test, on the basis of a plurality of infrared transmitters emitting infrared light simultaneously, when an infrared receiver receives infrared light, it may be affected by the infrared light emitted by other infrared transmitters, resulting in an increase in light intensity, which is not conducive to the identification of the finger trajectories. Therefore, after the collection of the ambient light is completed and before the test starts, it is also necessary to control the plurality of infrared transmitters of a group of first transmitters and the infrared transmitters of a group of second transmitters to emit infrared light in sequence according to a preset order, so that only one infrared transmitter emits infrared light each time. In some embodiments, referring to FIG. 6, each infrared transmitter is numbered. That is, starting from the lower left corner to the upper left corner, the infrared transmitters in the first transmitters are numbered according to the natural number sequence, and then starting from the upper left corner to the upper right corner, the infrared transmitters in the second transmitters are numbered according to the natural number sequence. It is possible to set the preset order in such a way that the first transmitters emit infrared light first, followed by the second transmitters. When emitting, the order should follow the sequence from the transmitter with the smallest number to the one with the biggest number.

It is worth noting that since the tester may click on the screen or slide on the screen when operating the product to be tested, in order to accurately collect the finger trajectories, there are also requirements for the switching frequency of the infrared transmitter. The above-mentioned finger trajectories refers to the locations when the finger clicks on the screen and the trajectories of the finger sliding.

For example, suppose that there are 16 infrared transmitters in a group of first transmitters, 16 infrared receivers in a group of first receivers, 25 infrared transmitters in a group of second transmitters, and 25 infrared receivers in a group of second receivers. Each time a set of channel data is collected, it is necessary to wait for 5 us. Each receiver is connected to 3 16-channel ADCs. In this way, when one transmitter is on, the data of all receivers may be read back at one time. The ADC reads back all the data with a parallel interface, which takes about 50 us. In addition, each time it takes about 100 us to collect a set of ambient light, and it takes 5 us each for the light to be on and off. The total time for the collection when the light is on is 5 us+50 us, and the total time for the collection of the ambient light when the light is off is 5 us+50 us. The total time is 110 us. In addition, about 80 us of calculation time is also needed each time. The total collection time for one light is 610 us. There are 41 groups of lights, and the total collection time for all the lights is 41*(110+80)=7790 us. Thus, the allowed maximum sampling frequency is 1000000 us/7790 us=128 hz, which is the limit collection frequency. In some embodiments, the collection frequency may be any frequency from 32 hz to 128 hz.

During the actual test, when the tester's finger falls on a certain location on the display screen of the product to be tested, suppose that an infrared transmitter in the first transmitters emits infrared light. At this time, all the infrared receivers in the first receivers may collect infrared light, but due to the blockage of the finger, the light intensity of the infrared light received by some infrared receivers may be significantly weaker than that received by other infrared receivers. In order to determine the location of the finger, it is necessary to simultaneously collect the light intensity information, i.e., the light intensity signals, of the infrared light received by all the infrared receivers in the first receivers. Similarly, it is also necessary to simultaneously collect the light intensity information, i.e., the light intensity signals, of the infrared light received by all the infrared receivers in the second receivers. In other words, whenever different infrared transmitters emit infrared light, the light intensity signals output by each infrared receiver needs to be collected.

Since the light intensity signals may be affected by the ambient light, the only difference between the case where the anti-interference mode is not started and the case where the anti-interference mode is started is that when the anti-interference mode is started, after obtaining the light intensity signals output by each infrared receiver in a group of first receivers and the light intensity signals output by each infrared receiver in a group of second receivers, the light intensity signals are processed based on the ambient light information. The ambient light information is subtracted from the collected light intensity signals to reduce the interference of the ambient light on the light intensity signals. Due to the fast change frequency of the ambient light, when actually collecting the light intensity signals, it is necessary to first turn off all the infrared transmitters to collect the ambient light, and then control one infrared transmitter to emit infrared light. When the collection of the light intensity signal is completed, the ambient light is collected again, and so on.

In one or more other embodiments, the influence of the ambient light on the light intensity signal may also be reduced in other ways.

Step S120: determining a finger area based on locations of an infrared receiver with the weaker output light intensity signal and an infrared transmitter that emits infrared light.

The finger area is the area where the finger contacts the screen of the device under test.

Optionally, step S120 includes the following steps (Step S121-Step S122):

Step S121: determining a plurality of blocking paths based on the location of the infrared transmitter that emits infrared light at each moment and the location of the infrared receiver with the weaker output light intensity signal.

Taking a certain moment as an example, suppose that the tester's finger is just in contact with the screen of the device under test. At this time, an infrared transmitter emits infrared light, and all infrared receivers may collect infrared light. The infrared receivers not blocked by the finger may receive all the infrared light, and the infrared receivers blocked by the finger may receive a certain intensity of infrared light due to the influence of the blocking degree. Based on the location of the infrared receiver with the weaker output light intensity signal and the relative locations with respect to other infrared receivers, the blocked area, that is, the blocking path, may be determined. The vertices of the blocking path are the infrared transmitter that emits infrared light and the infrared receiver with weaker output light intensity signal.

When a plurality of fingers come into contact with the screen of the device under test, by analyzing the intensity changes of the light intensity signals output by all the infrared receivers, a plurality of blocking paths may be obtained.

Similarly, when the infrared transmitter that emits infrared light changes, the light intensity signals output by all the infrared receivers may also change, and thus one or more blocking paths may be determined with the above method. After all the infrared transmitters are switched over one by one in accordance with the preset order to emit infrared light, a plurality of different blocking paths may be obtained.

In some embodiments, the collection area may be represented in coordinate form, that is, taking the lower left corner as the origin, any point in the collection area may be represented in coordinate form. Based on the location of the infrared receiver with the weaker output light intensity signal and the relative locations with respect to other infrared receivers, the coordinate set corresponding to the blocking path may be determined. After all the infrared transmitters are switched over one by one in accordance with the preset order to emit infrared light, a plurality of coordinate sets representing different blocking paths may be obtained.

Step S122: determining an overlapping area of the plurality of blocking paths and recording the overlapping area as the finger area.

It can be understood that when the finger location remains unchanged, the infrared light is emitted from different locations, which may form different blocked areas, and the overlapping area of all the blocked areas is the location where the finger is located. Based on this, by determining the overlapping area of the plurality of blocking paths, the finger area may be obtained.

Step S130: determining an effective finger area of the finger area to obtain the interaction coordinate information.

Since the finger area is the area where the finger contacts the screen of the device under test, and there may be misoperations in the actual test process, the determined finger area may affect the accuracy of collecting the finger trajectories. Therefore, it is necessary to determine the valid part in all the finger areas.

In some embodiments, it is mainly determined from two aspects of shape and area whether the finger area is valid. That is, it is determined whether the area of each finger area does not exceed 0.5 cm² and is not less than 0.01 cm², and it is determined whether each finger area is quasi-circular. When a finger area simultaneously satisfies the above two conditions, the finger area is valid. Otherwise, when the finger area does not satisfy any of the above conditions, the finger area is an invalid finger area.

The method for estimating the area of the finger area is to first count the number of intersections in the finger area, and then determine an area of the finger area based on a product of the number of intersections and a unit area. The intersections here may be understood as the intersections of grids after the collection area is divided based on the unit distance of the horizontal coordinate and the unit distance of the vertical coordinate. The number of intersections in the finger area may be approximately equal to the number of grids in the finger area. The unit area is the area of a grid. By calculating a product of the number of intersections and the unit area, the area of the finger area may be estimated, thereby facilitating the determination whether the area of the finger area is within the specified range. In some embodiments, the area range of the effective finger area may be adaptively adjusted according to the actual situations.

Further, the process of determining whether the finger area is quasi-circular is as follows:

First, obtaining coordinate information of each point in the finger area, and determining a centroid coordinate of the finger area based on the coordinate information.

In the above process, the finger area has been determined based on the coordinate sets of the plurality of blocking paths, and naturally the coordinate set of the finger area may also be obtained. That is, the coordinate information of each point in the finger area is obtained. The horizontal coordinate of the centroid is the average of the minimum horizontal coordinate, and the maximum horizontal coordinate in the coordinate information of all the points in the finger area. The vertical coordinate is the average of the minimum vertical coordinate, and the maximum vertical coordinate in the coordinate information of all the points in the finger area.

Then, determining distances from the centroid coordinate to edges of the finger area based on the centroid coordinate and the coordinate information of each point in the finger area. A horizontal axis passing through the centroid and a vertical axis passing through the centroid may be provided, the distances between the two intersections of the horizontal axis and the finger area and the centroid coordinate respectively are the distances to be determined, and the distances between the two intersections of the vertical axis and the finger area and the centroid coordinate respectively are also the distances to be determined.

Finally, calculating a variance value based on the distances from the centroid coordinate to the edges of the finger area, and determining whether the finger area is quasi-circular based on the relationship between the variance value and a preset threshold. The variance value is the average of the sum of the squares of the four distance values. When the variance value is less than or equal to the preset threshold, the finger area is quasi-circular. When the variance value is greater than the preset threshold, the finger area is non-quasi-circular.

In some other embodiments, whether the finger area is valid may also be determined based on other methods.

It is worth noting that the centroid coordinate of the effective finger area may be regarded as the location coordinate where the finger contacts the display screen of the device under test, that is, the interaction coordinate information. In some embodiments, after determining the location coordinate of the finger, the coordinate of the finger may be transmitted through the ksens protocol. In some embodiments, there may be 10 channels for data transmission. When a plurality of fingers of the tester are in contact with the device under test, the corresponding location coordinates are transmitted in the same number of channels in the data transmission channels. Otherwise, when none of the tester's fingers is in contact with the device under test at a certain moment, all channels send (−1, −1) to indicate that there is no finger trajectory at present.

The obtained display content information of the device under test refers to the content currently being displayed by the display device, which is also called the display interface in the foregoing embodiments. The display content may be directly output through the display information output interface of the device under test, which will not be elaborated in the present disclosure.

Step S200: matching the obtained interaction coordinate information and display content information at the same time to obtain a finger operation state information corresponding to the content displayed on the device under test.

Both the interaction coordinate information and the display content information carry time marks, so that the interaction coordinate information and the display content information may be matched as information at the same time. In order to accurately analyze the rules and habits of the interactions between the users and the information systems, it is necessary to simultaneously collect the movement trajectory data and interaction data of the finger. Therefore, it is necessary to match the interaction coordinate information and the display content information through the same time mark to obtain the finger operation state information.

Step S300: analyzing the finger operation state information to obtain operation interaction data of the finger on the device under test.

The finger operation interaction data at least includes the finger interaction trajectories, the staying time of fingers, and the number of interactions.

After obtaining the finger operation state information at each moment, information such as the finger interaction trajectories, the staying time of fingers, and the number of interactions may be obtained based on the analysis of the finger operation state information, so as to understand interaction rules and habits of the user.

Figure 7:
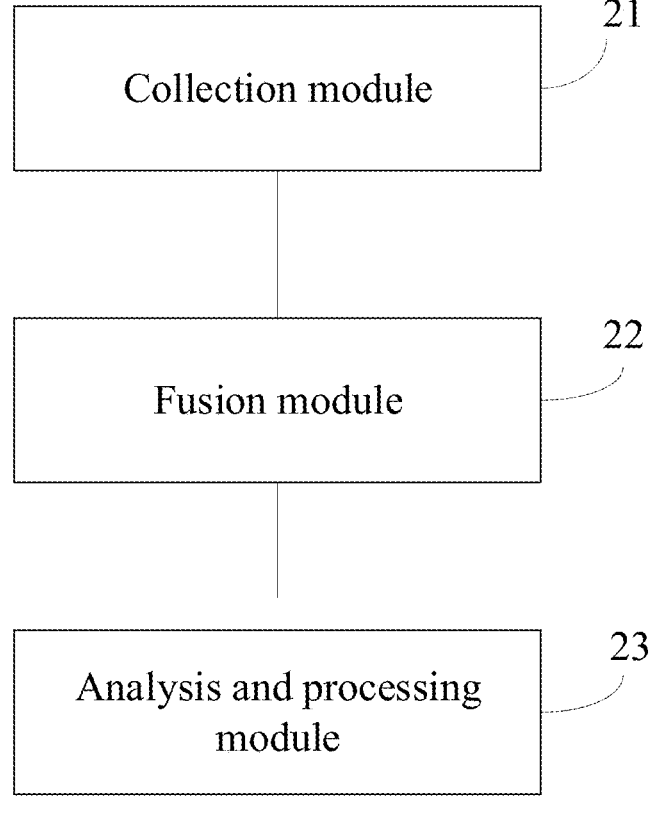
FIG. 7 is a schematic diagram of a multimodal finger trajectory collection device according to an embodiment of the present disclosure.

FIG. 7 shows a multimodal finger trajectory collection device according to an embodiment of the present disclosure.

The multimodal finger trajectory collection method according to the embodiments of the present disclosure may be well applied in the above scenarios and may facilitate the accurate analysis of the rules and habits of the interactions between the users and the information systems.

The multimodal finger trajectory collection device shown in FIG. 7 includes a collection module 21, a fusion module 22, and an analysis and processing module 23.

The collection module 21 is configured for obtaining interaction coordinate information and display content information of the device under test, the interaction coordinate information is a location of at least one finger interacting on the collection device.

The fusion module 22 is configured for matching the obtained interaction coordinate information and display content information at the same time to obtain finger operation state information based on the content displayed on the device under test.

The analysis and processing module 23 is configured for analyzing the finger operation state information to obtain operation interaction data of a finger on the device under test, and the finger operation interaction data at least includes finger interaction trajectories, staying time of fingers, and the number of interactions.

The embodiments above are only some feasible ways and does not limit other feasible ways.

Embodiments of the present disclosure also provide a multimodal finger trajectory collection system. The multimodal finger trajectory collection system is an electronic device including the multimodal finger trajectory collection device in the above embodiments.

Figure 8:
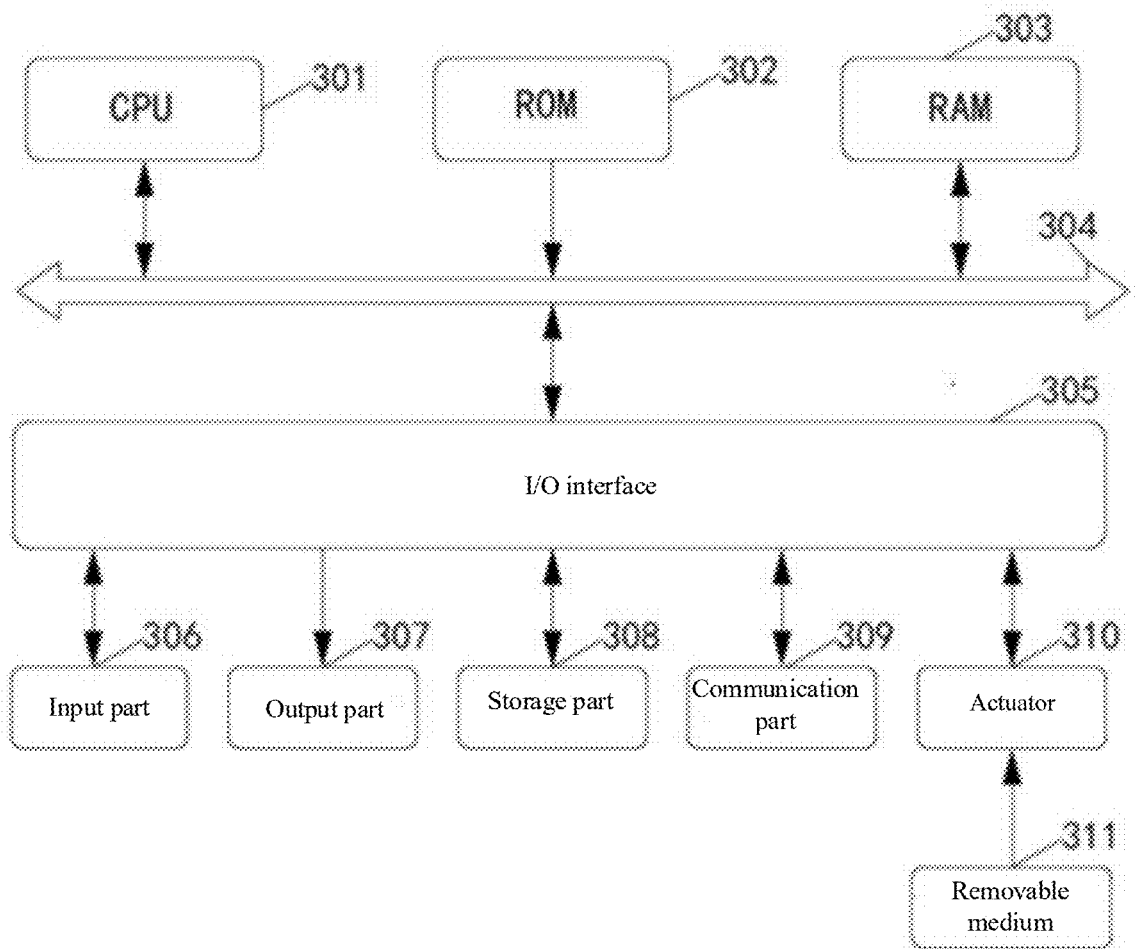
FIG. 8 is a structural schematic diagram of an electronic device according to an embodiment of the present disclosure.

FIG. 8 shows a structural schematic diagram suitable for implementing the electronic device of the embodiments of the present disclosure.

As shown in FIG. 8, the electronic device includes a central processing unit (CPU) 301, which may perform various appropriate actions and processing based on programs stored in a read-only memory (ROM) 302 or programs loaded from a storage part into a random access memory (RAM) 303. In the RAM 303, various programs and data required for system operations are also stored. The CPU 301, ROM 302, and RAM 303 are connected to each other through a bus 304. The input/output (I/O) interface 305 is also connected to the bus 304.

The following components are connected to the I/O interface 305: an input part 306 including a keyboard, a mouse, etc., an output part 307 including a cathode ray tube (CRT), a liquid crystal display (LCD), a speaker, etc., a storage part 308 including a hard disk, etc., and a communication part 309 including a network interface card such as a Local Area Network (LAN) card, a modem, etc. The communication part 309 performs communication processing via a network such as the Internet. The actuator 310 is also connected to the I/O interface 305 as needed. The removable medium 311, such as a magnetic disk, an optical disk, a magneto-optical disk, a semiconductor memory, etc., is installed on the actuator 310 as needed, so that the computer program read from it may be installed into the storage part 308 as needed.

According to the embodiments of the present disclosure, the process described above with reference to the flowchart in FIG. 5 may be implemented as a computer software program. For example, embodiments of the present disclosure includes a computer program product, which includes a computer program carried on a machine-readable medium, and the computer program includes program codes for performing the method shown in the flowchart. In such embodiments, the computer program may be downloaded and installed from the network through the communication part 309 and/or installed from the removable medium 311. When the computer program is executed by the central processing unit (CPU) 301, the above-mentioned functions defined in the system of the present disclosure are performed.

It should be noted that the computer-readable medium shown in the present disclosure may be a computer-readable signal medium or a computer-readable storage medium or any combination of the two. The computer-readable storage medium may be, for example, but not limited to, systems, apparatuses or devices which are electrical, magnetic, optical, electromagnetic, infrared, or semiconductor in nature, or any combination thereof. More specific examples of the computer-readable storage medium may include, without being limited to, electrical connections with one or more wires, portable computer disks, hard disks, random access memory (RAM), read-only memory (ROM), erasable programmable read-only memory (EPROM or flash memory), optical fibers, portable compact disc read-only memory (CD-ROM), optical storage devices, magnetic storage devices, or any suitable combination thereof. In the present disclosure, the computer-readable storage medium may be any tangible medium that contains or stores programs, and the programs may be used by an instruction execution system, apparatus or device or used by the combination thereof. In the present disclosure, the computer-readable signal medium may include data signals propagated in the baseband or as part of a carrier, in which computer-readable program codes are carried. Such propagated data signals may in many forms, including but not limited to electromagnetic signals, optical signals, or any suitable combination thereof. The computer-readable signal medium may also be any computer-readable medium other than the computer-readable storage medium, and the computer-readable medium may send, propagate or transmit programs used by an instruction execution system, apparatus or device or any combination thereof. The program codes included in the computer-readable medium may be transmitted by any appropriate medium, including but not limited to, wireless, wire, optical cable, RF, etc., or any suitable combination thereof.

The flowcharts and block diagrams in the drawings illustrate the possible implementation architectures, functions and operations of the systems, methods and computer program products according to various embodiments of the present disclosure. Each block in the flowcharts or block diagrams may represent a module, program segment, or part of code, and the aforementioned module, program segment, or part of code contains one or more executable instructions for implementing the specified logical function. It should also be noted that in some alternative implementations, the functions marked in the blocks may also occur in a sequence different from that shown in the drawings. For example, two blocks that are represented consecutively may actually be executed substantially in parallel, or sometimes in the reverse order, which depends on the functions involved. It should also be noted that each block in the block diagrams and/or flowcharts, and the combination of blocks in the block diagrams and/or flowcharts, may be implemented by a dedicated hardware-based system for performing the specified functions or operations, or may be implemented by a combination of dedicated hardware and computer instructions.

The units or modules involved in the embodiments described in the present disclosure may be implemented in a software manner or in a hardware manner. The described units or modules may also be configured in the processor. For example, it may be described as: a processor includes: a collection module 21, a fusion module 22, and an analysis and processing module 23. The names of these units or modules do not constitute a limitation to the units or modules themselves in some cases. For example, the collection module 21 may also be described as "a module for obtaining interaction coordinate information and display content information of the device under test".

As another aspect, the present disclosure also provides a computer-readable storage medium, which may be included in the electronic device described in the above embodiments. It may also exist independently and is not assembled into the electronic device. The aforementioned computer-readable storage medium stores one or more programs. The aforementioned program is used by one or more processors to execute the multimodal finger trajectory collection method described in the present disclosure.

The above are all preferred embodiments of the present disclosure and do not limit the protection scope of the present disclosure. Any feature disclosed in the present specification (including the abstract and the drawings), unless specifically stated, may be replaced by other equivalent or similar purpose alternative features. That is, unless specifically stated, each feature is only one example in a series of equivalent or similar features.

What is claimed is:

1. A multimodal trajectory information processing and analysis system based on man-machine interaction terminal, comprising: a collection sensor, an information processing device, and data transmission interface;

wherein the collection sensor is configured to collect, finger operation trajectory information comprising real-time operation interaction information, and send the collected finger operation trajectory information to the information processing device through the data transmission interface;

the information processing device is configured to receive a display interface of a device under test in real time, and is configured to fuse and display the collected finger operation trajectory information corresponding to the display interface of the device under test, and obtain an evaluation system of man-machine interaction experience by analyzing finger operation trajectories; and a bracket and a lifting device;

wherein the bracket is configured to place the device under test and support an upper limb of a tester;

the lifting device is connected to the bracket and is configured to adjust a location of the bracket; and the collection sensor is fixed arranged on the lifting device at an end away from the bracket.

2. The multimodal trajectory information processing and analysis system based on man-machine interaction terminal according to claim 1, further comprising:

a distance measuring device and a controller;

wherein the distance measuring device is configured to detect a distance between the collection sensor and the device under test, and output a distance detection signal; and the lifting device is connected to the controller and is configured to adjust the distance between the collection sensor and the device under test in response to receiving a control signal.

3. The multimodal trajectory information processing and analysis system based on man-machine interaction terminal according to claim 1, wherein the collection sensor is configured to collect and output the real-time operation interaction information, and the operation interaction information at least comprises interaction locations, durations of the interaction locations and the number of the interaction locations; and the information processing device is connected to the collection sensor and is configured to receive the operation interaction information in real time, and generate the finger operation trajectory information based on the received operation interaction information.

4. The multimodal trajectory information processing and analysis system based on man-machine interaction terminal according to claim 3, wherein the collection sensor comprises a touch sensor unit, and the touch sensor unit is located above the display interface of the device under test.

5. The multimodal trajectory information processing and analysis system based on man-machine interaction terminal according to claim 4, wherein the touch sensor unit is made of transparent plate material, and the touch sensor unit covers the display interface of the device under test.

6. The multimodal trajectory information processing and analysis system based on man-machine interaction terminal according to claim 4, wherein the touch sensor unit is a transparent film, and is closely attached to the display interface of the device under test.

7. The multimodal trajectory information processing and analysis system based on man-machine interaction terminal according to claim 3, wherein the optical sensor unit comprises an infrared transceiver sensor.

8. The multimodal trajectory information processing and analysis system based on man-machine interaction terminal according to claim 7, wherein for collection of the interaction locations by the collection sensor, the collection sensor is configured to:

obtain a plurality of light intensity signals, wherein the light intensity signals are configured to reflect light intensity of infrared light received by any infrared receiver in a group of first receivers or any infrared receiver in a group of second receivers, and the first receivers and second receivers are infrared receivers arranged along two adjacent sides of the device under test;

determine a finger area based on a location of an infrared receiver with a weaker output light intensity signal and a location of an infrared transmitter that emits the infrared light; and determine an effective finger area of the finger area to obtain interaction coordinate information.

9. The multimodal trajectory information processing and analysis system based on man-machine interaction terminal according to claim 8, wherein for the determination of the finger area based on the location of the infrared receiver with the weaker output light intensity signal and the location of the infrared transmitter that emits the infrared light, the collection sensor is configured to:

determine a plurality of blocking paths based on the location of the infrared transmitter that emits the infra-red light at each moment and the location of the infrared receiver with the weaker output light intensity signal; and determine an overlapping area of the plurality of blocking paths and recording the overlapping area as the finger area.

10. The multimodal trajectory information processing and analysis system based on man-machine interaction terminal according to claim 9, wherein for the determination of the effective finger area in the finger area, the collection sensor is configured to:

determine whether an area of each finger area does not exceed 0.5 cm$^2$ and is not less than 0.01 cm$^2$; and determine whether each finger area is quasi-circular;

wherein in response to the finger area simultaneously satisfying the above two conditions, the finger area is regarded as the interaction coordinate information.

11. The multimodal trajectory information processing and analysis system based on man-machine interaction terminal according to claim 10, wherein for the determination of whether each finger area is quasi-circular, the collection sensor is configured to:

obtain coordinate information of each point in the finger area;

determine a centroid coordinate of the finger area based on the coordinate information;

determine distances from the centroid coordinate to edges of the finger area based on the centroid coordinate and the coordinate information of each point in the finger area; and calculate a variance value based on the distances from the centroid coordinate to the edges of the finger area;

wherein in response to the variance value being less than or equal to a preset threshold, the finger area is quasi-circular; and in response to the variance value being greater than the preset threshold, the finger area is non-quasi-circular.

* * * * *